W. STONER.
RAISIN CLEANER.
APPLICATION FILED MAR. 24, 1920.

1,384,494.

Patented July 12, 1921.

INVENTOR.
William Stoner
BY
Francis C. Huebner,
ATTORNEYS.

UNITED STATES PATENT OFFICE.

WILLIAM STONER, OF FRESNO, CALIFORNIA.

RAISIN-CLEANER.

1,384,494. Specification of Letters Patent. Patented July 12, 1921.

Application filed March 24, 1920. Serial No. 368,388.

*To all whom it may concern:*

Be it known that I, WILLIAM STONER, a citizen of the United States, and resident of Fresno, in the county of Fresno and the State of California, have invented a new and useful Improvement in Raisin-Cleaners, of which the following is a specification.

My invention relates to a machine for cleaning the loose leaves and stems from raisins and similar fruits. My present invention is a modification of that described in my application filed December 16, 1919, Serial No. 345,325.

It is well known to those familiar with the dried fruit and raisin industry that when the fruit and raisins are brought to the packing house much of the natural growth of stems are thereon and some leaves, that the raisins are then subjected to a process which break the stems therefrom, that thereafter they are run over a screen by which the small particles of stems and leaves are eliminated, but that it has always heretofore been impossible to separate the larger stems and leaves from the raisins except laboriously by hand work.

The object of my invention is to thoroughly clean raisins and similar dried fruits of stems and leaves. Other objects will be apparent from a reading of this specification.

Figure 1:
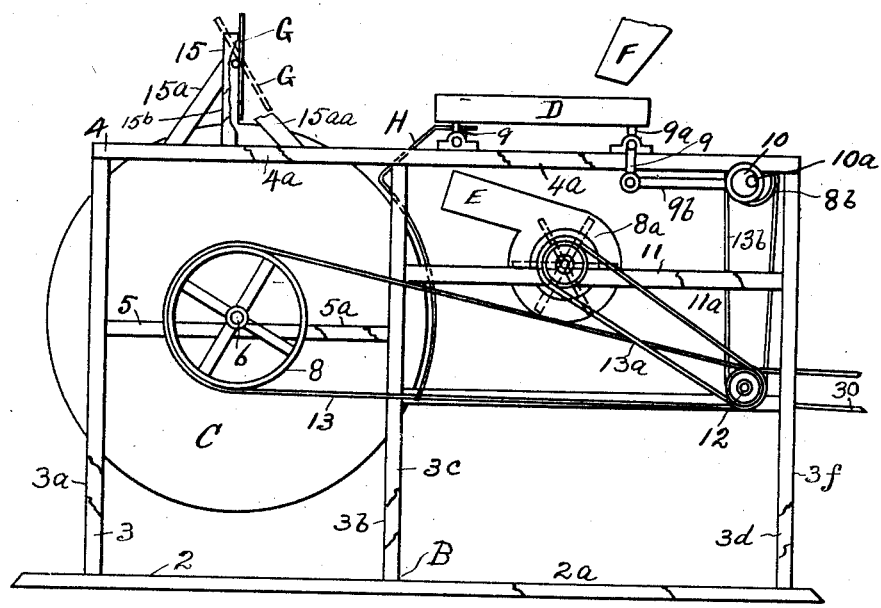
Figure 2:
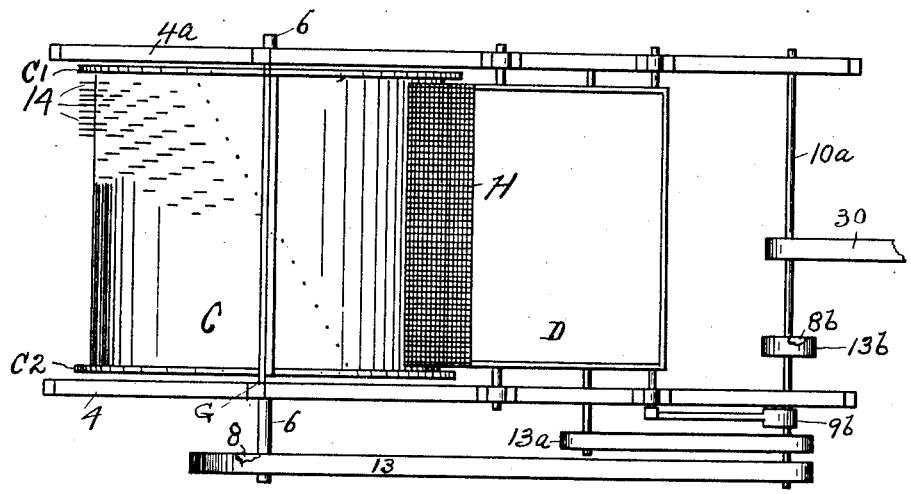

I accomplish these objects by means of the device hereinafter described and illustrated on the accompanying drawing in which Figure 1 is a side view of the device complete. Fig. 2 is a top view of Fig. 1. In said drawing B is a rectangular frame consisting of parallel bottom pieces 2 and $2^a$, upright posts arranged in pairs 3 and $3^a$, $3^b$ and $3^c$, and $3^d$ and $3^f$, which are attached at the lower end to bottom pieces 2 and $2^a$ and upper plates 4 and $4^a$. 5 and $5^a$ are parallel horizontal cross supports extending between cross supports 3 and $3^c$, and $3^a$ and $3^b$. Supports 5 and $5^a$ carry a shaft 6 on journals attached to said supports. Shaft 6 carries a drive wheel 8 and a drum C. Drum C is located on the shaft between the supports 5 and $5^a$. Its periphery is formed of a smooth surface, preferably metal and extending radially therefrom are a plurality of projections 14 which I have found advisable in experiments to form about five inches long. I have arranged these projections in staggered rows and approximately one inch apart. It is herein noted that these projections can be longer or shorter than above noted and they may be placed closer together or farther apart depending largely on the character of the fruit it is desired to clean. Drum C has flanges $C^1$ and $C^2$ on the ends thereof. D is a shaker pivoted to upright vibrating levers 9 and $9^a$ which are agitated by an eccentric 10, rotated by a shaft $10^a$. $9^b$ is the eccentric arm which directly connects with a rocker arm $9^r$, which moves vibrating lever $9^a$. Shaker D is arranged so its outlet is directly above a portion of drum C. 11 and $11^a$ are cross supports between uprights $3^c$ and $3^f$ and $3^b$ and $3^d$. Their purpose is to make the frame B rigid and to support a rotary fan E adapted to direct a current of air over the top of the drum C and between the drum and the shaker D. F is a spout for feeding raisins and fruit to shaker D. 12 is the main drive shaft for the machine having a series of pulleys thereon. 13 is a belt extending from a pulley on shaft 12 to a pulley 8 to rotate the drum. $13^a$ is a belt from a pulley $8^a$ to a pulley on shaft 12 to operate the fan and $13^b$ is a belt from a pulley $8^b$ on shaft $10^a$ to a pulley on shaft 12 to operate the shaker. By this means it will be noted that the drum C rotates away from the shaker, the shaker deposits fruit which may be therein to the periphery on the upper side of the drum, and fan E directs a current of air through the fruit as it falls from the shaker to the surface of the drum. The raisins being comparatively round, and heavier than the stems, and the surface of the drum being smooth, the raisins will roll downward on the periphery of the drum between the projections 14, while the stems will be either blown backward or become entangled in the projections 14 and are carried to, and drop from the opposite side of the drum on which the raisins and fruit is deposited. 15 and $15^b$ are upright posts extending upward on plates 4 and $4^a$ on line with a vertical diameter of drum C. Posts 15 and $15^b$ are parallel and in Fig. 1 post $15^b$ is shown where a portion of post 15 is broken away. $15^a$ and $15^{aa}$ are braces for posts 15. G is a baffle board extending across the periphery of the drum between posts 15 and $15^b$ and is pivoted thereto so that the angle of the baffle board is adjustable. This board is in line with the current of air from fan E.

Raisins are not uniform in specific gravity and frequently it is necessary to change the adjustments. The object of the baffle board G is for this purpose. When the raisins are heavy the baffle board can be set so it is approximately vertical and the heavy raisins will roll over the smooth surface of the drum toward the side where the raisins are to be deposited. The lighter raisins however may under such adjustment be blown too far forward on the drum, and roll over with the stems. To overcome this objection the lower end of the baffle board is moved toward the shaker so that the raisins blown against it will roll to a portion of the drum where the surface is steeper and where the action of gravity on the raisins is less hindered than when they are deposited nearer the top of the cylinder. 30 is the main belt for operating the device.

H is a screen extending from a point under the shaker to a spaced distance from the periphery of drum C and thence bent in conformity with the drum downward, and adjusted a spaced distance therefrom. Screen H can be attached to plates 4 and 4ª. This screen should extend a short distance under the shaker D but should be spaced from the shaker and from the rocker arm 9 so the shaker or rocker arm will not touch the screen in the movement of the shaker. It will be noted that this screen forms a slide for the raisins and the current of air from fan E passes through it. The curved portion of the screen is intended to overcome any centrifugal motion imparted to the raisins and to uniformly direct the direction of the flow of the raisins.

The size of the pulleys operating drum C, fan E and shaker D can be determined by the respective speeds at which these various parts should be operated. 30 is the main belt for driving shaft 12.

I claim as new and ask for Letters Patent:—

1. In a device of the character described the combination of a rotatable drum having a smooth outer surface and a plurality of pins extending radially therefrom, means for rotating the drum, a shaker adapted to deposit fruit to be cleaned upon the periphery of the drum at a point thereon where its rotation gives the periphery an upward movement, a fan adjusted to direct a current of air approximately toward the periphery of the drum and adjacent to the discharge of the shaker, substantially as described and for the purposes set forth.

2. In a device of the character described the combination of a rotatable drum having a smooth exterior and a plurality of radially disposed pins projecting from the periphery, a shaker adapted to discharge fruit on the portion of the periphery of the drum having an upward movement in its rotation, means for directing a current of air between the drum and the discharge opening in the shaker, and a baffle board pivoted above the drum on line with its lineal diameter, and in the path of said air current.

3. In a device of the character described the combination of a rotatable drum having a normally smooth exterior and a plurality of radially disposed pins projecting beyond the periphery, a shaker adapted to discharge fruit on the portion of the periphery which has an upward movement in the rotation of the drum, means for directing a current of air across the path of the fruit as it drops from the shaker toward the periphery of the drum, a baffle board extending across the face of the drum normally in line with the vertical radius of the drum, a baffle board extending across the face of the drum normally in line with the vertical radius extension, and adapted to be moved so that the lower end is nearer to the discharge opening substantially as described.

WILLIAM STONER.

Witnesses:
CLEO K. CURTIS,
LOMA HOBÉ.